Nov. 5, 1963  J. A. SEINER  3,109,831
COOKING POLYESTERS OF POLYBASIC ACIDS AND POLYHYDRIC
ALCOHOLS IN THE ABSENCE OF SOLVENTS
Filed Nov. 14, 1960
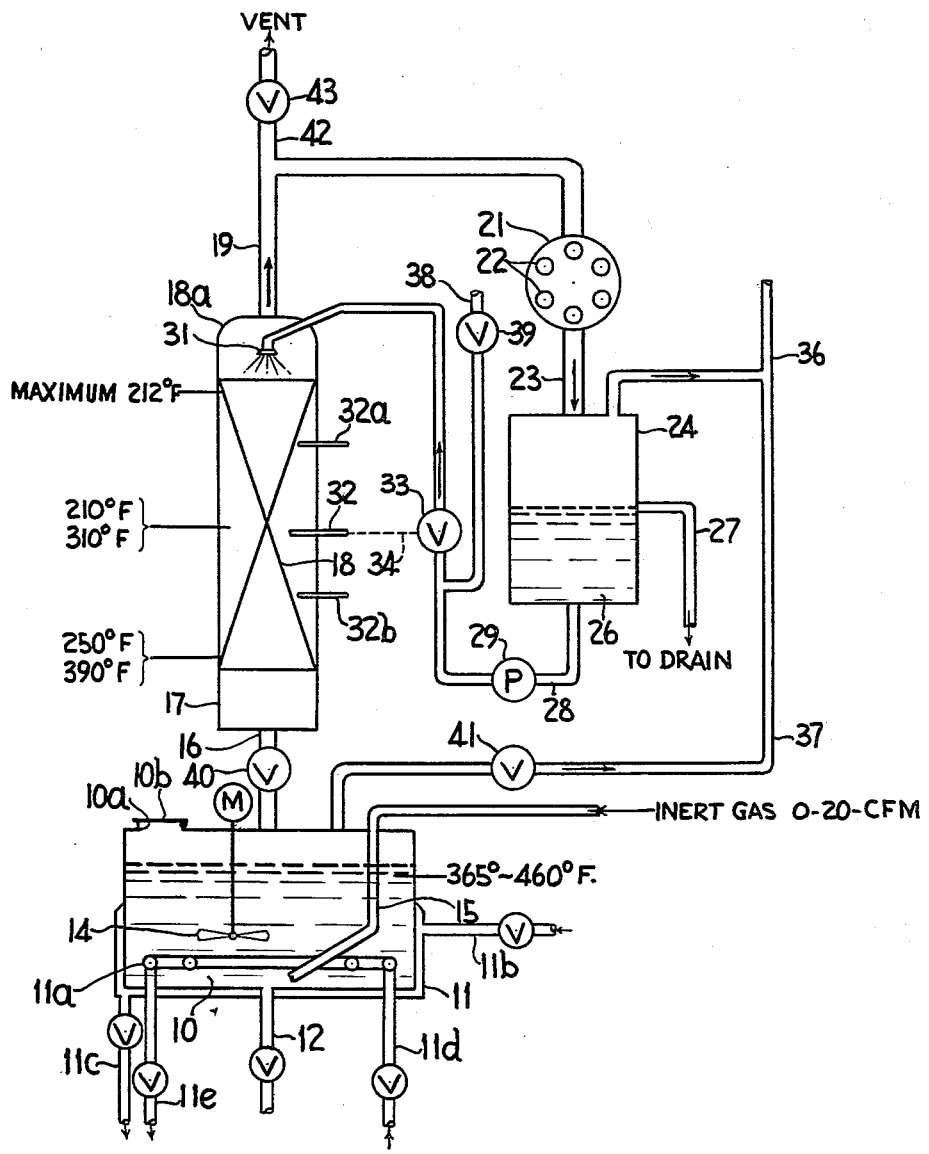
INVENTOR.
JEROME A. SEINER
BY
Oscar L Spencer
ATTORNEY

United States Patent Office 3,109,831
Patented Nov. 5, 1963

3,109,831
COOKING POLYESTERS OF POLYBASIC ACIDS AND POLYHYDRIC ALCOHOLS IN THE ABSENCE OF SOLVENTS
Jerome A. Seiner, Pittsburgh, Pa., assignor to Pittsburgh Plate Glass Company, Pittsburgh, Pa., a corporation of Pennsylvania
Filed Nov. 14, 1960, Ser. No. 68,988
7 Claims. (Cl. 260—75)

This invention relates to a method of preparing a polyester of a dicarboxylic acid and a polyol, and it has particular relation to a method whereby the loss of polyol component due to volatilization in the reactor is reduced or eliminated, and whereby reaction times are substantially reduced.

It has heretofore been disclosed to prepare polyesters of dicarboxylic acids, such as one of the isomeric phthalic acids or an anhydride thereof, or a mixture thereof, with an alpha, beta-ethylenically unsaturated acid, such as maleic acid (or its anhydride) or fumaric acid, and a polyol, such as propylene glycol, by heating the mixture to produce esterification with concomitant evolution of water. In the event that an anhydride of a dicarboxylic acid is employed as the source of the acid, the reaction may be regarded as proceeding in stages as follows:

STAGE I

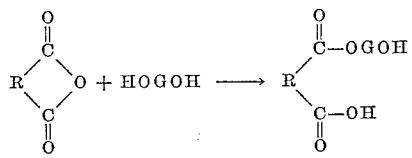

In this stage, no water is evolved, the anhydride ring being merely split to form a partial ester in which one of the carboxyls of the acid and one of the hydroxyls of the polyol component remain unreacted. If the resultant partial ester is further heated, the terminal hydroxyl and terminal carboxyl of contiguous molecules enter into reaction to form chains, which may be approximately represented by the formula:

STAGE II

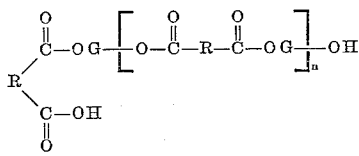

R and G being respectively organic moieties in a carboxylic acid and a polyol, $n$ being a number from 1 to about 500, or sometimes more, dependent upon molecular weight of the polyester. Simultaneously, water is liberated. When the ratio of polyol to acid is high, some molecules of polyester may have the formula:

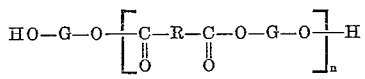

R, G and $n$ having the significance previously given.

In the event that the free acid is employed in the reaction, the liberation of water begins immediately with the esterification reaction, as indicated by the equation:

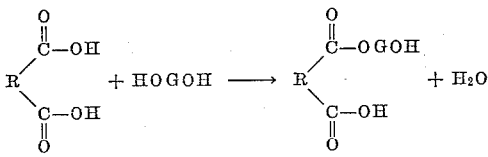

As the reaction proceeds to form chains comprising alternate acid and polyol residues, more water is evolved, as in the preceding equations.

Since the foregoing reactions are reversible, it is necessary to remove the evolved water from the reaction zone as it is formed if a reasonable degree of completion of reaction within a reasonable time is to be attained. To facilitate this removal of water, a solvent for the reactants which is a non-solvent for the water has often been added (usually in small amount). As the reaction proceeds, the solvent boils off and the vapor thereof carries away most of the water substantially as it is evolved. In conventional practice, the vapors of water and solvent have been condensed and separated in a suitable trap, the water being discarded and the solvent being returned to the reactor (at least so long as solvent is required in the latter).

This process has been found to be objectionable in certain respects. For example, it has been found that appreciable quantities of many of the polyols are volatilized and carried out of the reactor in the vapor mixture from the latter. The polyol is condensed with the water of reaction in the condenser and has been discarded to the sewer. Although the concentration thereof in the discarded water is low, the total amount thereof is often a substantial percentage of the polyol introduced into the reactor. If reasonably low acid values are to be attained, it is necessary to add excess polyol to the reactor to compensate for this loss.

In addition to being wasteful of polyol, the conventional techniques of polyester resin production, in spite of the fact that they do effect removal of water from the reaction zone, tend to be quite slow and therefore expensive from the standpoint of heat requirements.

In U.S. Patent 2,892,813, to Wavering et al., it has been disclosed to improve the performance of the conventional esterification reaction by the provision of a column upon the reactor. In the apparatus as disclosed in the patent, the column is provided at the top thereof with means for supplying water thereto in order to form an azeotropic mixture of vapors of water and solvent, while keeping the lower portions of the column relatively hot in order to prevent the return of water downwardly from the column to the reaction zone. In this process, the vapors of water and solvent pass out of the column as an azeotropic mixture, thus effectively eliminating the water from the system. The polyol, which does not form an azeotrope, is condensed and passes back down through the hot portion of the column to the reactor with but little or no return of water.

The azeotropic mixture of water and solvent vapors from the top of the column are condensed and the resultant liquid condensate is subjected to separation into phases, the solvent phase being returned to the reactor. Such part of water as is required may be put back into the top of the column to facilitate maintenance of azeotropic conditions. Such water as is not required in the latter operation is discarded with but little loss of polyol component therein. In the patented process it has also been disclosed to blow the reaction mixture with inert gas and to take the vapor mixture from the top of the column at a temperature above the boiling point of water.

Concomitantly with the conservation of polyol from the reaction kettle in the foregoing processes, it has also been observed that there is some degree of speed-up in the reaction, thus increasing the out-put of the apparatus and saving on heat requirements. The reaction time is still fairly long, often extending over a period of about 15 to about 17 hours, or longer in certain instances.

This invention contemplates the provision of a process of cooking polyesters by so-called "fusion cook" or bulk polymerization, that is, a process wherein the use of a solvent is not required, the loss of polyol as vapors from the reactor, however, being greatly reduced and concurrently, the rate of reaction being greatly speeded up, often to such degree that cooking time is divided in half or even further reduced.

In accordance with the provisions of this invention, these and other advantages are attained by application of the following steps:

(A) The reaction of esterification between the polyol and the dicarboxylic acid is conducted in a reactor without the inclusion of a liquid solvent or diluent, but with a relatively heavy flow of a nonreactive gas designed to sweep out water as a vapor and thus to remove it from the reaction zone.

(B) The mixture of gas and vapors of water containing some polyol vapor is passed upwardly through a column, which preferably is packed as with a material such as Beryl saddles, Intalox saddles, Raschig rings, or with bubble plates or other suitable packing, or any fractionating device such as to give at least one theoretical plate of separation.

The temperature of the column preferably is graduated along its length, being at a rather high value in the lower zones thereof and being at least sufficiently high to vaporize any water tending to return to the reactor, but being below the reaction temperature in the reactor. The top of the column is maintained at a temperature which is not above the boiling point of water and preferably is substantially below, e.g., within a range of about 100° F. to about 210° F.

(C) In the operation of the apparatus, during those stages of the esterification reaction wherein appreciable amounts of water are being evolved, a flow of inert gas is maintained through the reaction mixture and through the column at sufficient rate to assure that the water of reaction is adequately removed as it is formed. The rate of gas flow is also sufficient to assure that even in the top of the column wherein water is used as a cooling medium, the gas flow is sufficient to carry all of the water under its partial pressure from the relatively cool zone in the top of the column without build-up of water and return thereof to the lower portions of the column, while vapors of the polyol are condensed in the column and are returned to the reactor.

For a better understanding of the invention, reference may now be had to the accompanying drawings, in which the single figure is a diagrammatical representation of apparatus suitable for use in the practice of the invention. In this apparatus is provided a suitable reaction vessel, such as a reactor 10, having charging means represented by a hatch 10a with a lid 10b that will allow raw materials to be introduced into the vessel prior to starting the reaction run or during the run. Any means which will transfer energy to the reaction vessel may be employed to heat the mixture in the reactor. Examples of such means are represented by direct gas fire to the vessel, radiant heat, direct electrical heat, circulating fluids such as Arochlor, condensing vapors such as Dowtherm, or steam and the like. For purposes of llustration is shown a heating jacket 11 and a heating coil 11a through which heating media, such as one of those mentioned, may be circulated. They may be used simultaneously or separately. The jacket and coil are provided with appropriate inlets and outlets indicated respectively at 11b, 11c, 11d and 11e for the circulation of said media. The reactor is also provided with an outlet 12 for discharge of ester product. Obviously, the several inlets and outlets may be provided with valves V by means of which the flow of fluid may be regulated.

A mechanical stirrer 14 may be used to agitate the contents of the reactor. The reactor is also provided with an inlet 15 which extends below the surface of the reaction mixture so that gas can be bubbled upwardly through the mixture whereby to remove the water of reaction as it is formed. The gas also assists in circulating the liquids in the reactor and may even be the sole means for producing the latter function. The flow of gas upwardly through the reactants has been found to greatly improve circulation within the vessel both with and without mechanical assistance. If desired, the gases may be preheated to aid in supplying heat to the reaction zone, though such feature is optional. The reactor is further connected by a vapor line 16 to a column 17 of conventional design, which as diagrammatically indicated at 18, is suitably packed as with bubble plates or other packing to provide at least one plate of separation.

A vapor line 19 leads from section 18a to a condenser 21, having appropriate cooling means, such as conduits 22, through which a cooling medium may be circulated in order to condense all but the non-condensable components of the vapor mixture.

Condensate from the condenser passes downwardly through a line 23 to the storage container 24 in which the condensate, consisting essentially of water, is collected as at 26. Since water tends to collect in excess of that required for the future re-use in the chamber 24, a drain 27 is provided, by means of which said excess can be drained off continuously or intermittently to the sewer or to suitable storage, as may be desired. Such part of the water as may be desired for cooling purposes in the top of the column 17 is returned through a line 28. Flow may be by gravity or, as shown, may be effected by means of pump 29. Discharge may be through spray nozzle 31, though such device is not strictly necessary, as any means to distribute the water to afford direct contact with hot vapors may be used. Water from a separate source, if of sufficient purity, may also be used; all of the condensate from the storage container 24 being then run to the sewer, with the off gas vapors being directed to the atmosphere directly from the column top without being condensed.

A thermocouple or other suitable temperature-responsive device 32 is disposed in the column, preferably at about the mid-portion thereof, or in a zone between about one-quarter of the way from the top and one-quarter of the way from the bottom. The temperature in this zone is the criterion for the operation of the spray 31, although the zone of spray is usually, if not always, cooler than the zone about the device 32. A valve 33 is also disposed in the line 28 and may be operated to admit water through the sprinkler 31 to the top of the column in event that the temperature of the latter tends to rise to or above the boiling point of water. If desired, several temperature-registering devices, as at 32a, and 32b, may be provided. These are conveniently utilized, but are not strictly necessary.

The device 32 may be a thermometer providing a reading of the column temperature, in which instance the valve 33 may be operated manually at such times as are indicated by the readings of the temperature device. However, it is usually preferred to provide a suitable connection, such as an electrical line 34, between the temperature device, whereby the latter acts as a thermostat automatically to control the valve 33 when it is required to admit cooling water to the top of the column. Thermostatically controlled valves being conventional, it is not considered necessary to elaborate upon the specific structure thereof.

It will be apparent that in this zone, the thermostat 32 can be so set that it will respond as the temperature goes up or down to operate valve 33 to turn on or shut off the spray 31 as required to keep the top of the column below the boiling point of water. Water, when turned on, will continue to flow until the top of the column is cooled and water descends in the column sufficiently to cool the zone about the thermostat to cause it to close the valve. This positioning of the thermostat below the top of the column gives a system of high stability. The thermostat should not be too low, else water in moving down the column to influence it, might pass on into the reactor.

Means to discharge gases from the system are indicated as comprising a vent pipe 36 from the storage container 24. This pipe may discharge to the atmosphere or may be discharged to suitable apparatus for drying the gases and returning the latter to the reactor. The vent pipe is further connected to a line 37 from the top of the reactor or the bottom of the column 17, whereby the mixture of gas and water vapor, after the polyol has been reacted with acid to form an ester, can be by-passed about the column 17.

It will further be evident that where a satisfactory source of relatively pure cooling water is present, the condensate from the condenser 21 is not required. In that event, the gas-water vapor mixture can thus be allowed to escape to the atmosphere, cooling water for column 17 being drawn from such other source through line 38 having a control valve 39. In event that cooling water for spray 31 is taken from line 38 and the condensate from trap 24 is discarded, the cool inert gas from column 17 laden with all of the water from the system in vapor form and stripped or largely stripped of polyol vapors, may be vented through line 42 controlled by valve 43. Valves 40 and 41, respectively, in lines 16 and 37, provide means for directing the gas-vapor mixture through, or around the column as may be desired.

When the evolution of water from reactor 10 slows up and as a result, the zone around thermostat 32 starts to cool, the valve 40 may be closed. Valve 41 may be opened and the flow of gas stepped up and vented through line 37 to the atmosphere.

In the practice of the present invention, various polyesters involving different components may be prepared. The preferred polyols are usually glycols, many of which tend to be volatile and, therefore, escape rapidly from the reactor. This is especially true of glycols, the organic portions of which are hydrocarbon, i.e., without ether linkages. These glycols include ethylene glycol, propylene glycol and butylene glycol. The ether glycols, such as diethylene glycol, and dipropylene glycol, also tend to escape to some extent, though not so much as the foregoing glycols. Other polyols which are also sometimes lost to some degree comprise tripropylene glycol, triethylene glycol and glycerine. The present system may be applied in the preparation of any of the polyesters wherein these or other polyols, singly or in admixture, are used.

Likewise, the system is applicable to the preparation of polyesters using various polycarboxylic acids. The term "acids" as herein used also includes the anhydrides thereof where the latter exist. Obviously, the anhydrides are often preferred in the reaction because they tend to react to form esters more rapidly than do the free acids, and during the early ring-breaking stages, do not evolve substantial amounts of water. The following are typical anhydrides which may be used in the reaction:

Maleic anhydride
Phthalic anhydride
Endomethylenetetrachlorophthalic anhydride
Tetrachlorophthalic anhydride
Tetrahydrophthalic anhydride
Succinic anhydride The following are typical free acids which may be used in the reaction:

Adipic acid
Isophthalic acid
Terephthalic acid
Fumaric acid
Maleic acid

Obviously, mixtures of free acids and anhydrides, or two or more anhydrides, or two or more free acids may be used in the reaction.

In the reaction, various inert or nonreactive gases may be used to sparge the reaction mixture and thus to remove water therefrom. Carbon dioxide constitutes one such gas. Likewise, nitrogen may be employed. Preferred gases comprise combustion gases such as are obtained by burning a fuel gas or a hydrocarbon gas with air to form a mixture consisting largely of carbon dioxide and nitrogen with perhaps some carbon monoxide and minor amounts of other gaseous constituents, such as oxygen. In conducting the reaction, it is preferred that the esterification components be introduced into the reactor and in the event that the anhydrides of the acids are employed without substantial amounts of free acids, the use of inert gas to remove water during the initial stages of esterification as represented in the previously given formulae, is not required.

In conducting the reaction through the main water-producing stages, the gas may be supplied at such rate as will remove the water from the reactor and will further carry the water from the top of the column under its own partial pressure at the temperature existing in the latter region and at a rate that will keep the bottom of the column hot and free from returning water. A useful formula for determining the rate of gas flow in reactors of 300 gallons capacity or larger during the main part of the reaction is as follows:

$$C.f.m. = 1 + K\ G$$

wherein c.f.m. indicates cubic feet of gas flow per minute, K is a number from about 0.001 to about 0.04, in most instances it is about 0.019, and G indicates the gallons of reaction mixture. Thus, for a 1000-gallon reactor, the formula indicates a flow of inert gas $$(c.f.m.) = 1 + 0.019 \times 1000 = 20\ c.f.m.$$

This rate for a 1000-gallon batch may be varied substantially, for example, by about 50 percent either way, though it is considered that the rate of about 20 cubic feet per minute is near the optimum for the reaction mixture normally charged to a 1000-gallon reactor. If the rate of gas flow is unduly reduced, it will be evident that the volume of gas will be insufficient to carry all of the water from the reactor and through the cool zone in the top of the column. For example, if a flow rate of 0.5 cubic feet of gas per minute were substituted for the previously calculated 20 cubic feet per minute, the reaction time would be considerably longer due to poor water removal. If the gas flow is unduly increased during the main cooking stage, it will be apparent that there may be a tendency for the mixture to foam and there will be an undue over-carry of the polyol component in the vapors passing from the top of the column.

With the smaller sizes of reactors, the foregoing formula may tend to break down owing to the large value of the constant 1. However, even with reactors as small as 25 gallons the gas flow will not be below about 0.5 cubic feet per minute. The flow seldom will exceed $1 + 0.03\ G$ (G being gallons of batch) until most of the polyol component has been at least partly reacted with the acid component.

At the conclusion of the main reaction when substantially all of the glycol is tied into the polyester and the evolution of water has slowed down, the sparge rate may be speeded up in order more completely to carry the reaction to completion and thoroughly to remove water from the polyester product. For example, the gas flow for a 1000-gallon batch may be increased to about 40 or 60 cubic feet per minute and may be carried even higher, though, of course, excessive use of sparging gas during the final stages of the reaction tends to be uneconomical because of the requirements of gas.

It will be recognized that inert gases from the reaction may be passed to the stack after they have passed through the condenser, or they may be subjected to recovery treatment, as for example, by removal of water vapor and perhaps other impurities therefrom, after which they may be reused for other purposes as desired. It will be obvious that in those instances wherein the water from the vapor mixture is not reused for cooling purposes in the system, the mixture of gases and vapors may be allowed to escape from the column without condensing out the water.

The following constitute examples illustrating the practice of the invention.

*Example I*

In accordance with the provisions of this example, a reaction mixture was prepared comprising equal moles of maleic anhydride and phthalic anhydride, to which were added sufficient moles of propylene glycol to afford a 5 percent excess over that which would be required for a stoichiometric polyesterification reaction.

The spray 31 in the top of the column was adjusted to provide for a flow of about 1.5 to 2 gallons per minute.

The foregoing esterification mixture in an amount of 1000 gallons was introduced into reactor 10, shown in the drawings, no solvent being included in the mixture. Flow of inert gas through the reaction mixture was initiated at a reduced rate of 2 cubic feet per minute.

The temperature was increased rapidly to about 200° F., at which point active reaction was indicated by an exothermal rise. The application of heat may then be temporarily discontinued, for example, for about 20 minutes, though this is not essential, particularly in the instance of small batches.

During this time and during the subsequent cook, the temperature in the top of the column was maintained at a value not exceeding 212° F. by spraying water into the top of the column as required to obtain the desired temperature. The temperature range for this zone was about 100° F. to about 210° F. This cooling of the gas-vapor mixture in the top of the column was desirable in order to prevent loss of polyol, thus assuring shorter reaction times.

At the conclusion of the exothermal rise (at about 315° F.), the flow of inert gas (combustion gas) was adjusted to about 20 cubic feet per minute and was maintained during the remainder of the active reaction. This same rate may be used from the beginning, though it is higher than necessary. Often in the early stages of esterification, gas flow can be 2 cubic feet or less. This is especially true where the anhydrides of the acids are used.

Heat was supplied to the reactor as fast as practicable and the temperature rose as esterification progressed. After the anhydride rings were broken, the reaction was accompanied by evolution of substantial amounts of water, which were carried away from the reaction zone in the gas stream passing up through the column 17 to its top. The gas stream was sufficient to carry away all of the water as vapor, both from the reactor and that introduced for cooling the top section of the packed column with negligible quantities of it returning to the bottom of the column 17 or the charge in the reactor 10.

As esterification neared completion and nearly all of the hydroxyl groups of the polyol had been reacted into the ester form, the temperature in the reactor increased to the maximum of about 430° F. and owing to the decrease in volatile matter, such as water vapor and glycol, the temperature in the middle column tended to drop even without application of cooling water through spray 31. This constituted an indication that the propylene glycol was all reacted and most of the water had evolved. During this time and subsequent times, little or no cooling water from the spray 31 was required in the top of the column.

On or after the temperature drop in the middle column, the acid number of the polyester product from the reactor was 63 and the viscosity was F on the Gardner-Holdt scale in a test sample comprising 60 percent solids in monoethyl ether of ethylene glycol and at 77° F. At this stage, the sparging rate was increased to 40–60 cubic feet of gas per minute in order fully to dry the product, to carry the esterification reaction to its final stages and to obtain the desired acid number and viscosity. Since at this time there was but a very low concentration of glycol vapor coming from the reaction mixture, the flow of reactor off-gas was switched from the column to the atmosphere by appropriate operation of the valves 40 and 41. During this period of high rate of sparging, frequent checks of acid number and viscosity of the product were made until the polyester was considered complete, at which time the readings were:

Acid number _____ 51
Viscosity (Gardner-Holdt) _____ H

The polyester was then discharged from the reactor and cooled below 250° F. for addition of monomer, such as styrene. The incorporation of the monomer and the subsequent use of the resultant interpolymerizable mixture is not a feature of the present invention and need not be described.

The log of the esterification run was as follows:

| Time in hours | Event |
|---|---|
| 0:00 | Inert gas and heat on, gas flow 2 c.f.m., subsurface. |
| 1:05 | Exothermal rise at 200° F., heat off, subsurface gas flow off. |
| 1:25 | Heat on at 315° F., gas flow on at 20 c.f.m., subsurface. |
| 4:00 | Mid-column temperature tended to drop. |
| 5:00 | Acid value 63, viscosity F. |
| 5:15 | Sparging rate increased, vented to atmosphere. |
| 6:00 | Acid value 51, viscosity H+. |
| 6:20 | Started discharging batch. |

The esterification times in this example and by the solvent method as disclosed in the Wavering et al. patent, are compared as follows:

|  | Non-solvent method | Solvent method |
|---|---|---|
| Esterification time | 6 hours, 20 minutes | 10 hours, 42 minutes. |

The saving in time was 4 hours, 22 minutes.

The foregoing constitutes a typical run under the provisions of the present invention. It will be manifest that the amounts of the batch may be increased or decreased to meet individual requirements of the operator. The ratio of the inert gas may be increased or decreased, for example, in a range of about 10 to about 60 cubic feet per minute for a 1000 gallon reactor.

It will also be apparent that various esterifiable mixtures may be reacted in the apparatus and allowing for individual differences of the individual mixtures, substantially the same procedures as given in the foregoing example may be used.

*Example II*

In accordance with this example, an esterifiable mixture was prepared comprising:

|  | Moles |
|---|---|
| Maleic anhydride | 10 |
| Diethylene glycol | 12 |

These components were pre-esterified to an acid value in a range of 25 to 30, and to the resultant polyester were added:

|  | Moles |
|---|---|
| Phthalic anhydride | 10 |
| Propylene glycol | 8.8 |

The resultant mixture was then further esterfied in the apparatus illustrated in the drawings and using the techniques described in Example I, the top of the column being cooled by spray of water to a temperature below the boiling point of water. In the cooking operation, the sparging rate with inert gas was 20 cubic feet per minute and cooking was continued until a final acid number of 25 to 35 was attained.

The total time of esterification in this example and the corresponding esterification time for preparing the same polyester in like amount but by the techniques and apparatus of the foregoing patent to Wavering et al. and using xylene as a solvent, are compared as follows:

|  | Non-solvent method | Solvent method |
|---|---|---|
| Esterification time | 10 hours, 25 minutes | 17 hours, 25 mins. |

*Example III*

In this example, an esterifiable mixture was prepared and comprised:

| | Moles |
|---|---|
| Propylene glycol | 11 |
| Isophthalic acid | 6 |
| Maleic anhydride | 4 |

A 1000 gallon quantity of this mixture was cooked in the apparatus as illustrated in the drawings, the mixture being subjected to sparging with inert gas at the rate of 20 cubic feet per minute until the temperature in the mid-zone ceased to rise. The rate was then raised to 40–60 cubic feet per minute.

The column 17 was operated under the conditions indicated for the same in Example I, the bottom being in a range of 250° F. to 390° F., and the top of the column was maintained at a temperature below the boiling point of water by use of a water spray as previously described. The reaction was continued until an acid value in a range of 17 to 34 was attained and a Gardner-Holdt viscosity of T–V at a concentration of 60 percent of the polyester in the monoethyl ether of ethylene glycol was attained. This is a difficult esterification and large excesses of glycol are required even when the techniques of the Wavering et al. patent are used. A substantial saving in propylene glycol is obtained by using the techniques of this invention.

The comparative reaction times and requirements in excess propylene glycol are tabulated as follows:

|  | Non-solvent method | Solvent method |
|---|---|---|
| Time | 11 hours, 50 minutes | 25 hours. |
| Excess propylene glycol used | 10 percent | 17–20 percent. |

The time required using the techniques of this invention was therefore less than half that required using the former technique. The saving in excess propylene glycol was 41 to 50 percent based on the excess used in the process.

*Example IV*

In accordance with this example, an esterifiable mixture was prepared comprising:

| | Moles |
|---|---|
| Phthalic anhydride | 3 |
| Maleic anhydride | 2 |
| Propylene glycol | 4.1 |
| Diethylene glycol | 1.4 |

This mixture, in an amount of 1000 gallons, was cooked in the apparatus as shown in the drawings, with inert gas; namely, combustion gas, flowing through the mixture at a rate of 20 cubic feet per minute, and with the top of the column cooled by a spray of water to a temperature below the boiling point of water. The rest of the column was maintained as previously described.

Esterification was continued as described in Example I until the temperature in the mid-portion of the column ceased to rise, even though water was no longer being added to the top of the column. The sparge rate was increased to 40–60 cubic feet per minute. The polyester was discharged and had an acid number of 38 and a Gardner-Holdt viscosity of F in a 60 percent solution in the monoethyl ether of ethylene glycol.

The reaction time and corresponding time following the techniques of the Wavering et al. patent are:

|  | Non-solvent method | Solvent method |
|---|---|---|
| Time of reaction | 6 hours, 40 minutes | 9 hours, 21 minutes. |

The apparatus and techniques disclosed in these examples may be applied to the preparation of polyesters of other polyols and other dicarboxylic acids and/or anhydrides as described.

While specific examples of the invention have been set forth hereinabove, it is not intended to limit the invention solely thereto, but to include all of the variations and modifications falling within the scope of the appended claims.

Reference is made to applicant's commonly owned applications respectively entitled "Preparation of Polyesters" and "Increasing the Efficiency of Esterification Reactions," filed of even date herewith and being respectively of Serial No. 68,989 and Serial No. 68,990.

I claim:

1. The method of preparing a polymeric polyester from an esterification mixture consisting essentially of (A) at least one polyol selected from the group consisting of ethylene glycol, propylene glycol, butylene glycol, diethylene glycol, dipropylene glycol, dibutylene glycol, triethylene glycol and glycerine, and (B) at least one carbonyl compound selected from the group consisting of maleic anhydride, phthalic anhydride, endomethylene-tetrachlorophthalic anhydride, tetrachlorophthalic anhydride, tetrahydrophthalic anhydride, succinic anhydride, adipic acid, isophthalic acid, terephthalic acid, fumaric acid and maleic acid, by fusion cook, which method comprises heating said mixture in a reaction zone and in the substantial absence of solvents to a temperature to effect esterification reaction between components (A) and (B) to form said polymeric polyester, attended by the evolution and evaporation of water and also to evaporate a portion of the polyol, passing inert gas through said mixture at a rate to remove substantially all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water, whereby to condense out the vapors of the polyol, and returning the polyol condensed in said fractionating zone through said fractionating zone to the mixture in the reaction zone while permitting the gas and water vapor carried therein to pass out of the system, the flow of gas being sufficient to carry substantially all of the water from the top of the fractionating zone as vapor, and continuing to pass said inert gas through said esterification mixture until said esterification reaction has been carried to the desired stage and a polymeric polyester of desired acid value and viscosity is obtained.

2. The method of preparing a polymeric polyester from an esterification mixture consisting essentially of (A) at least one polyol selected from the group consisting of ethylene glycol, propylene glycol, butylene glycol, diethylene glycol, dipropylene glycol, dibutylene glycol, triethylene glycol and glycerine, and (B) at least one carbonyl compound selected from the group consisting of maleic anhydride, phthalic anhydride, endomethylene-tetrachlorophthalic anhydride, tetrachlorophthalic anhydride, tetrahydrophthalic anhydride, succinic anhydride, adipic acid, isophthalic acid, terephthalic acid, fumaric acid and maleic acid, by fusion cook, which method comprises heating said mixture in a reaction zone and in the substantial absence of solvents to a temperature to effect reaction between the components (A) and (B) to form said polymeric polyester, attended by the evolution of and evaporation of water and also to evaporate a portion of the polyol, passing inert gas through said mixture at a rate to remove substantially all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol, and returning the polyol condensed in the fractionating zone through said fractionating zone to said esterification mixture in the reaction zone, while permitting the gas and water vapor carried in the fractionating zone to pass out of the system, the flow of gas being sufficient to carry substantially all of the water from the top of said fractionating zone as vapor, the flow of gas being determined by the formula: c.f.m.$=1+K$ $G$, wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

3. The method of preparing a polymeric polyester from an esterification mixture consisting essentially of (A) at least one polyol selected from the group consisting of ethylene glycol, propylene glycol, butylene glycol, diethylene glycol, dipropylene glycol, dibutylene glycol, triethylene glycol and glycerine, and (B) a mixture of maleic anhydride and phthalic anhydride, by fusion cook, which method comprises heating said mixture in a reaction zone and in the substantial absence of solvents to a temperature to effect reaction between the components (A) and (B) to form said polymeric polyester, attended by the evolution and evaporation of water and also to evaporate a portion of the polyol, passing inert gas through said mixture at a rate to remove substantially all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol in the fractionating zone, and returning the condensed polyol through the fractionating zone to said esterification mixture in the reaction zone while permitting the gas and water vapor carried in the fractionating zone to pass out of the system, the flow of gas being sufficient to carry substantially all of the water from the top of the fractionating zone as vapor and being determined by the formula:

$$c.f.m. = 1 + K\ G$$

wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

4. The method of preparing a polymeric polyester from an esterification mixture consisting essentially of (A) diethylene glycol and (B) a mixture of maleic anhydride and phthalic anhydride, by fusion cook, which method comprises heating said esterification mixture in a reaction zone and in the substantial absence of solvents to a temperature to effect reaction between the components (A) and (B) to form said polymeric polyester, attended by the evolution of and evaporation of water and also to evaporate a portion of the polyol, passing inert gas through said mixture at a rate to remove substantially all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol, and returning the polyol condensed in the fractionating zone through said fractionating zone to said esterification reaction zone while permitting the gas and water vapor carried therein to pass out of the top of the fractionating zone, the flow of gas being sufficient to carry substantially all of the water from the system as vapor and being determined by the formula: c.f.m.$=1+K$ $G$, wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

5. The method of preparing a polymeric polyester from an esterification mixture consisting essentially of (A) propylene glycol and (B) a mixture of maleic anhydride and phthalic anhydride, by fusion cook, which method comprises heating said mixture in a reaction zone and in the substantial absence of solvents to a temperature to effect reaction between the components (A) and (B) to form said polymeric polyester, attended by the evolution and evaporation of water and also to evaporate a portion of the polyol, passing inert gas through the mixture at a rate to remove substantially all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol in said fractionating zone, and returning the condensed polyol through the fractionating zone to said esterification mixture in the reaction zone while permitting the gas and water vapor carried therein to pass out of the system, the flow of gas being sufficient to carry substantially all of the water from the top of the fractionating zone as vapor, the flow of gas being determined by the formula: c.f.m.$=1+K$ $G$, wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

6. The method of preparing a polymeric polyester from an esterification mixture consisting essentially of (A) a mixture of propylene glycol and diethylene glycol, and (B) a mixture of maleic anhydride and phthalic anhydride, by fusion cook, which method comprises heating said mixture in a reaction zone and in the substantial absence of solvents to a temperature to effect esterification reaction between the components (A) and (B) to form said polymeric polyester, attended by the evolution and evaporation of water and also to evaporate a portion of the polyol, passing inert gas through the mixture at a rate to remove substantially all of the water as vapor as it is evolved and to take up vapors of the polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol, and returning the condensed polyol through the fractionating zone to the reaction zone while permitting the gas and water vapor carried therein to pass out of the system, the flow of gas being sufficient to carry substantially all of the water from the system as vapor, the flow of gas being determined by the formula: c.f.m.=1+K G, wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

7. The method of preparing a polymeric polyester from an esterification mixture consisting essentially of (A) a polyhydric alcohol and (B) a dicarboxylic acid, by fusion cook, which method comprises heating said mixture in a reaction zone and in the substantial absence of solvents to a temperature to effect esterification reaction between the components (A) and (B) to form said polymeric polyester, attended by the evolution and evaporation of water and also to evaporate a portion of the polyol, passing inert gas through said mixture at a rate to remove substanitally all of the water as vapor as it is evolved and to take up vapors of polyol, passing the resultant gaseous mixture of inert gas, water vapor and polyol vapor through a fractionating zone, the lower portion of which is maintained at a temperature in a range between about 250° F. and about 390° F. while the top thereof is maintained at a temperature below about 212° F. and above about 100° F. by contacting the gas-vapor mixture in the top of the zone with liquid water whereby to condense out the vapors of the polyol in the fractionating zone, and returning the condensed polyol through the fractionating zone to the reaction zone while permitting the gas and water vapor carried therein to pass out of the system, the flow of gas being sufficient to carry substantially all of the water from the top of said fractionating zone as vapor, the flow of gas being determined by the formula: c.f.m.=1+K G, wherein c.f.m. equals cubic feet of gas per minute, K is a number in a range of about 0.001 to about 0.04 and G equals gallons of reaction mixture, and continuing to pass said inert gas through said esterification mixture until said esterification reaction has been carried to the desired stage and a polymeric polyester of desired acid value and viscosity is obtained.

References Cited in the file of this patent

UNITED STATES PATENTS

| | | |
|---|---|---|
| 2,892,812 | Helbing | June 30, 1959 |
| 2,892,813 | Georgian | June 30, 1959 |
| 2,973,341 | Hippe et al. | Feb. 28, 1961 |